United States Patent [19]
Sharaby et al.

[11] Patent Number: 6,017,491
[45] Date of Patent: Jan. 25, 2000

[54] NON-TOXIC CORROSION INHIBITIVE COMPOSITIONS AND METHODS THEREFOR

[75] Inventors: Ahmed Sharaby, Los Angeles County, Calif.; Robert N. Miller, Acworth, Ga.

[73] Assignees: Products Research & Chemical, Burbank; Lockheed Corporation, Calabasas, both of Calif.

[21] Appl. No.: 09/095,831

[22] Filed: Jun. 11, 1998

Related U.S. Application Data

[60] Continuation-in-part of application No. 07/373,550, Jun. 30, 1989, Pat. No. 5,006,588, which is a division of application No. 07/230,108, Aug. 9, 1988, abandoned, and a continuation-in-part of application No. 07/424,938, Oct. 23, 1989, Pat. No. 5,077,096.

[51] Int. Cl.[7] .................. C23F 11/00; C04B 9/02
[52] U.S. Cl. ................ 422/7; 106/14.05; 252/387
[58] Field of Search .................... 422/7; 106/14.05; 252/387

[56] References Cited

U.S. PATENT DOCUMENTS 5,711,996  1/1998  Claffey ................... 427/388.4

*Primary Examiner*—Kriellion S. Morgan
*Attorney, Agent, or Firm*—Oppenheimer Wolff & Donnelly LLP

[57] ABSTRACT

Elastomeric compositions having incorporated therein certain specific compounds and/or compositions which are non-toxic but render the metals to which the compositions are applied resistant to corrosion, particularly, when in a salt environment.

35 Claims, 15 Drawing Sheets

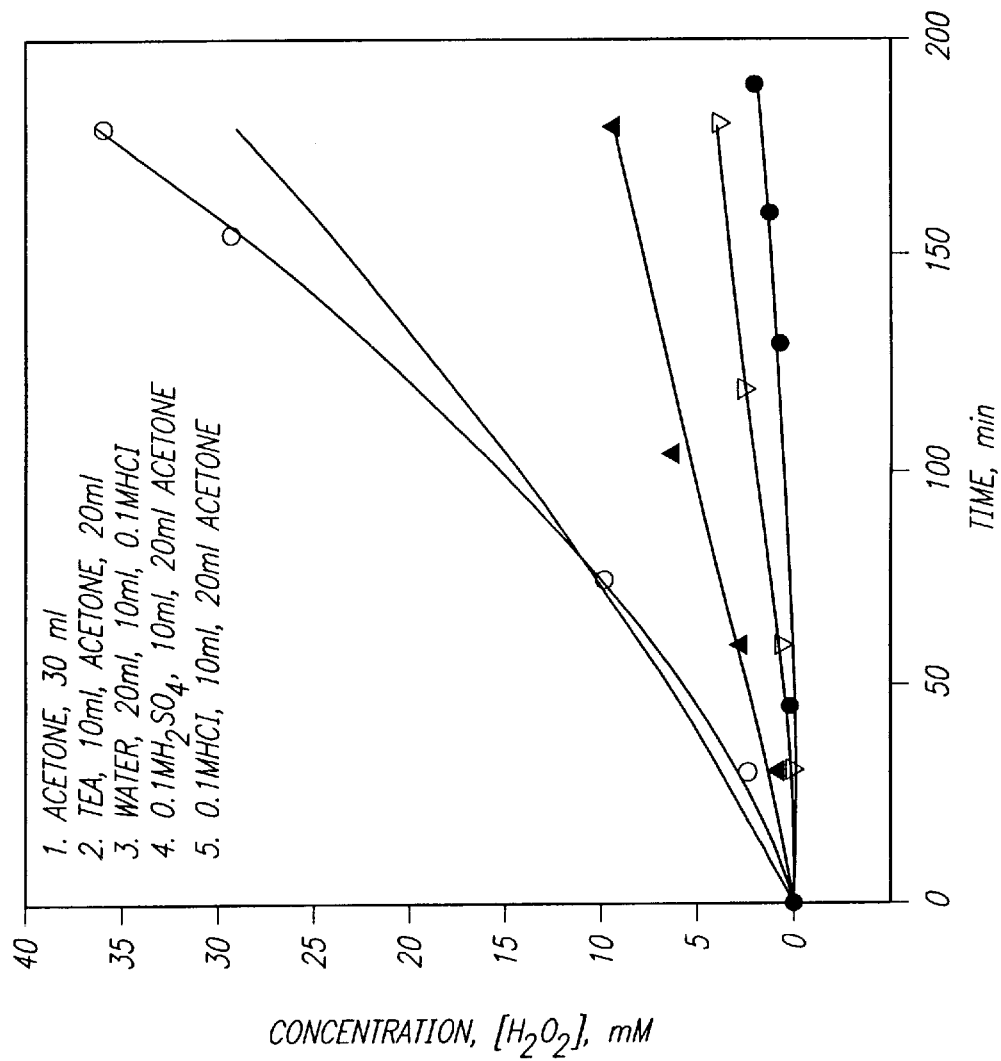

1: 3 LAYERS OF ANQ (FASilPdANQ3)
2: 1 LAYER OF NAP DERIVATIVE, 2 LAYERS OF ANQ (FASilPdNAP1ANQ2)
3: 1 LAYER OF PV, 2 LAYERS OF ANQ (FASilPdPV1ANQ2)
MEDIUM: ACETONE/ 0.1M $H^+$ ($H_2SO_4$)

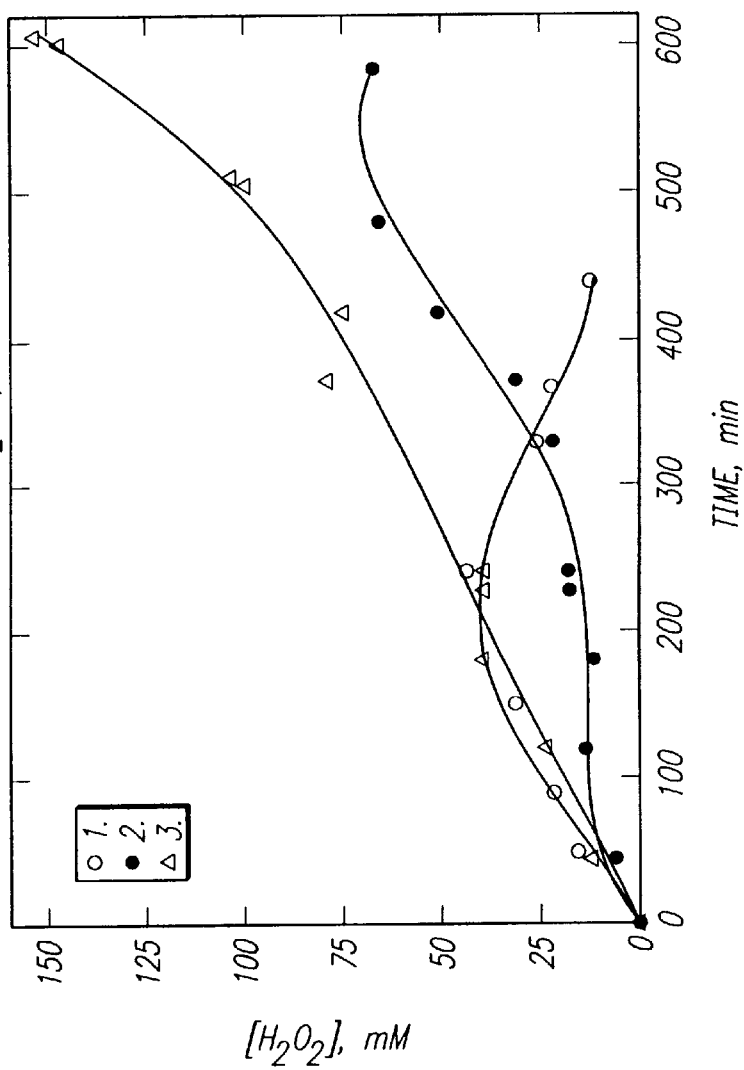

NON-TOXIC CORROSION INHIBITIVE COMPOSITIONS AND METHODS THEREFOR

CROSS REFERENCE TO RELATED APPLICATIONS

This application is a continuation-in-part application of application Ser. No. 07/373,550, filed Jun. 30, 1989, now U.S. Pat. No. 5,006,588, which in turn is a divisional application of Ser. No. 07/230,108 filed Aug. 9, 1988, now abandoned. This application is also a continuation-in-part application of application Ser. No. 07/424,938 filed Oct. 23, 1989, now U.S. Pat. No. 5,077,096.

BACKGROUND OF THE INVENTION

The present invention relates to compositions and methods for inhibiting the corrosion and/or crack growth of metals when exposed to ambient conditions, particularly when exposed to aqueous salt solutions which are oftentimes present in the environment (.e.g. aqueous NaCl solutions). The methods of the present invention include applying to the metal surfaces (e.g. as a coating) a corrosion and/or crack growth inhibitive composition which is preferably in the form of a polymeric coating and/or sealing composition (e.g. polyamides, acrylics, epoxy, etc.) and more preferably a liquid polymeric composition curable to a solid such as an elastomer. Such elastomeric polymeric compositions include polysulfides, polythioethers, polyurethanes and polyethers. Particularly preferable are mercaptan terminated polymers such as those curable to solid elastomers.

The present invention is particularly well-suited for inhibiting the corrosion of at least two metal parts which have a joint or space therebetween formed by the opposing mating surfaces of said metal parts which are secured together. In an attempt to prevent the corrosion of metal parts, the joint or space formed by the interface between said metal parts (particularly aluminum and/or an aluminum alloy) is oftentimes filled with a liquid polymer which is then cured to an elastomeric solid which helps to prevent aqueous salt solutions, as well as oxygen, from coming into contact with the mating surfaces of the metals which are joined. The problem of corrosion of aluminum (including aluminum alloys) is a serious one particularly in the case of aircraft and ships since the metals making up the aircraft and/or ship are oftentimes made of a number of metals (including aluminum and/or aluminum alloys) which are dissimilar. With dissimilar metals, corrosion is a particularly serious problem. For example, in the case of aircraft, aluminum and/or aluminum alloys are secured together with rivets having a surface of cadmium, nickel, stainless steel, titanium, etc. As noted, this causes severe corrosion problems when the spaces or joints between such rivets and panels are exposed to aqueous salt solutions, particularly in the presence of oxygen. The same is equally true of ships which have aluminum or aluminum alloy superstructures joined to steel hulls.

In the past, exclusion of aqueous salt solutions, electrical insulation and sacrificial anodes between dissimilar metals have been the primary means employed to control corrosion of such metals. The large stresses and movements of the structures of both aircraft and ships have made the use of elastomeric sealants and/or coatings the preferred material to both exclude aqueous salt solutions and accommodate structural movements. In practice, however, many interfaces of metal structures sealed or coated with elastomers become permanently contaminated with aqueous salt solutions which seriously attack and weaken structural components by corrosion and/or crack growth of the metals.

In addressing this problem, U.S. Pat. Nos. 3,730,937 and 3,841,896 utilize toxic chromates as corrosion inhibitive compounds. While the corrosion inhibitive chromate containing polysulfide coatings and sealants as disclosed in these patents, inhibited exfoliation corrosion of fastener holes as well as faying surface corrosion between adjacent exterior panels to thereby greatly extend the operational life of the metal structures, e.g. aircraft and the like; there is a growing concern with difficulties encountered in the disposal of the toxic chromate containing waste associated with such corrosion inhibitive compounds.

Because of the toxicity problem with chromates, other compounds have been investigated to reduce corrosion of metals, such compounds including sodium nitrate, sodium molybdate and sodium metasilicate. However, in order to achieve the same level of corrosion inhibition that is provided by chromate containing coatings and sealants, approximately five times as much of the non-toxic inhibitive compound had to be added to the sealant material. Moreover, when formulations containing these non-toxic corrosion inhibitor compounds are added to, for example, polysulfide sealants, the cure rate of the polysulfide sealant material is adversely effected, resulting in either a non-acceptable acceleration or retardation of the cure. While encapsulation of these inhibitor compounds has been proposed as a solution to the cure problem, it is both an expensive as well as time-consuming process.

As has been noted, in addition to corrosion, metallic structures which are cyclically stressed, such as aircraft, ships and the like, suffer from environmentally enhanced fatigue cracking. For example, the rate of fatigue cracking of high strength aluminum in a salt water environment is more than double that experienced in a dry desert-like environment. Environmentally enhanced fatigue cracking is, essentially, a hydrogen embrittlement phenomena and can be related to the corrosion process. When water reacts with a metal such as aluminum, the corrosion products are aluminum hydroxide and hydrogen. In a fatigue cracking situation, the nascent atomic hydrogen migrates to the zones of maximum stress at the crack tip and, by its physical presence, decreases the force required to pull grains apart. Research has shown that the best corrosion inhibitors, such as the chromates, have little effect on the rate of fatigue cracking of metals such as aluminum alloys once a crack has initiated.

SUMMARY OF THE INVENTION

Accordingly, the present invention relates to corrosion and/or crack growth inhibitive compositions which are essentially non-toxic to the environment as well as unreactive with polymeric coatings and sealants; particularly elastomeric materials so as to eliminate the detrimental effects of accelerating or decelerating the cure rate of the elastomeric polymer. The corrosion and crack growth inhibitive compositions of the present invention are (1) a mixture of (a) cerous molybdate and (b) at least one ammonium salt of phosphoric acid (ortho-, meta- or hypophosphoric acid) or ortho- or hypophosphorous acid (hereinafter sometimes referred to as the ammonium salts of phosphoric or phosphorous acid), (2) cerous molybdate, or (3) one or more of the ammonium salts of phosphoric or phosphorous acid.

The mixture of (a) cerous molybdate and (b) at least one of the ammonium salts of phosphoric or phosphorous acid may be applied to the metal directly but preferably is mixed with a liquid polymer composition curable to a coating or sealant (hereinafter sometimes referred to as cerous molybdate-ammonium salt liquid polymer composition) which is then applied directly to the metal to be protected. More preferably, this corrosion inhibitive and/or crack growth inhibitive composition of the present invention is incorporated into a liquid polymer curable to a solid elastomer (hereinafter sometimes referred to as cerous molybdate-ammonium salt liquid polymer elastomer composition) which is then applied to the metal and the liquid polymer elastomer composition cured to a solid elastomer.

Similarly, the cerous molybdate corrosion and/or crack growth inhibitive composition may be applied, per se, to the metal to be protected but it is preferred if the cerous molybdate is first mixed with a liquid polymer which is curable to a sealant or coating (hereinafter sometimes referred to as cerous molybdate liquid polymer composition). More preferably, the cerous molybdate is incorporated into a liquid polymer which is curable to a solid elastomer (sometimes hereinafter referred to as cerous molybdate liquid elastomer composition). The cerous molybdate liquid elastomer composition is applied to the metal and the composition cured to an elastomeric solid.

As was the case with the above two corrosion and/or crack growth inhibitive compositions of the present invention, the ammonium salts of phosphoric or phosphorous acid may be applied directly to the metal to be protected but it is preferred if said ammonium salts are first mixed with a liquid polymer which is curable to a sealant or coating (hereinafter sometimes referred o as ammonium salt liquid polymer composition) and then said ammonium salt polymer composition applied to a metal and the liquid polymer composition cured to a sealant or coating. More preferably, the ammonium salts of phosphoric or phosphorous acid are incorporated into a liquid polymer composition curable to a solid elastomer (hereinafter referred to as ammonium salt liquid polymer elastomer composition) which is applied to a metal and the composition cured to a solid elastomeric composition.

It is presently believed that the corrosion inhibitive and/or crack growth inhibitive effects of the compositions of the present invention are enhanced by adding zinc chloride thereto. This is accomplished by forming a relatively homogenous mixture of zinc chloride with the inhibitive compositions of the present invention, particularly compositions (1) or (2).

The compositions and methods of the present invention are particularly useful in preventing corrosion attack of aluminum and alloys by applying said compositions to the surface thereof. Said compositions and methods being even more useful in protecting the interfaces of aluminum or aluminum alloys and dissimilar metals joined together or connected thereto. This may be accomplished by filling the spaces between the interface with one or more of the liquid polymer compositions of the present invention (particularly the liquid elastomeric polymer compositions) and curing the liquid polymer to a solid. In the latter event, there is formed a solid sealant or coating (preferably an elastomeric sealant or coating) between the surfaces of the two dissimilar metals. This minimizes galvanic interaction between, e.g. aluminum and cadmium plated steel fasteners, a combination often found on modern day aircraft.

When using one or more of the ammonium salts of phosphoric acid and/or phosphorous acid, including the mixture of said ammonium salts with cerous molybdate, it is particularly surprising that said ammonium salts provide such effective corrosion inhibition in view of the fact that U.S. Pat. No. 4,212,793 discloses that various alkaline salts of phosphoric acid and phosphorous acid, when added to a poly (arylene sulfide) resin prevents corrosion to the mold used in molding the resin, said corrosion being due to contact of the mold with sulfur dioxide. It has been found that the water soluble salts mentioned in the U.S. Pat. No. 4,212,793 (sodium hypophosphite and sodium triorthophosphate) do not have any significant effect, when incorporated into elastomers, in preventing corrosion of metals such as aluminum and/or aluminum alloys due to exposure to aqueous salt solutions.

Ammonium salts that have been found to be particularly effective either per se or in a mixture containing cerous molybdate and/or zinc chloride, are the ammonium salts of orthophosphoric acid and hypophosphorous acid. The preferred ammonium salts are ammonium hypophosphite and ammonium dihydrogen phosphate, including mixtures thereof. It is presently believed that incorporation of these ammonium salts in a liquid polymer which, preferably, is cured to an elastomeric solid when in contact with the metal part or parts, will alleviate pitting and corrosion, particularly crevice corrosion, of such metal parts as well as inhibiting crack growth. The present invention is believed to be very useful in preventing pitting, corrosion, and cracking of aluminum (including aluminum alloys) even when said surfaces are secured or coupled together by a fastener such as a rivet made of a dissimilar metal, e.g. titanium. Additionally, compositions of the present invention minimize galvanic interaction between aluminum and fasteners made of titanium and cadmium plated steel.

The presently preferred liquid polymers are polysulfides, polyurethanes, polythioethers and polyethers and the particularly preferred liquid polymers are those which are mercaptan terminated.

The present invention is particularly beneficial in elastomeric polymers which are cured using an alkaline oxidation catalyst. For example, most mercaptan terminated polymers are cured with an oxidation catalyst which is alkaline, either per se or by the addition of an alkaline material such as sodium hydroxide. In order to effect a cure of such polymers using most oxidation catalysts, the cure must be effected in an alkaline environment, i.e. the pH must be greater than 7.

Oxidation catalysts useful in curing the mercaptan terminated polymers of the present invention include organic and inorganic peroxides, (e.g. calcium peroxide) and oxides such as manganese dioxide. In the case of manganese dioxide, a slight amount (from about 0.5 to about 3 weight percent) of sodium hydroxide is added in order to make the catalyst effective. It is particularly surprising that the ammonium salts of the present invention achieve such excellent results because it would be expected that the sodium hydroxide present in the manganese dioxide catalyst would convert the ammonium salts to the corresponding sodium salts which, as noted above, have been shown to be relatively ineffective in reducing corrosion and/or inhibiting fatigue crack growth of metal parts when exposed to aqueous salt solutions.

As noted hereinbefore, the corrosion and crack growth inhibitive compounds of the present invention have relatively low toxicity and, just as importantly, do not adversely affect the curing properties of the liquid polymers, particularly elastomeric liquid polymers, which form a part of the coating and sealant compositions of the present invention.

THE APPLICATION DRAWINGS

FIG. 1 is a potentiodynamic plot for untreated 7075-T6 aluminum in 3.5 weight percent NaCl;

FIG. 2 is a potentiodynamic plot for 7075-T6 aluminum in 3.5 weight percent NaCl and 0.05% MgCrO4; and FIG. 3 is a potentiodynamic plot for 7075-T6 aluminum in 3.5 weight percent NaCl, about 0.018 weight percent cerous molybdate and about 0.015 weight percent sodium nitrate.

DETAILED DESCRIPTION OF THE PRESENT INVENTION

Figure 1:
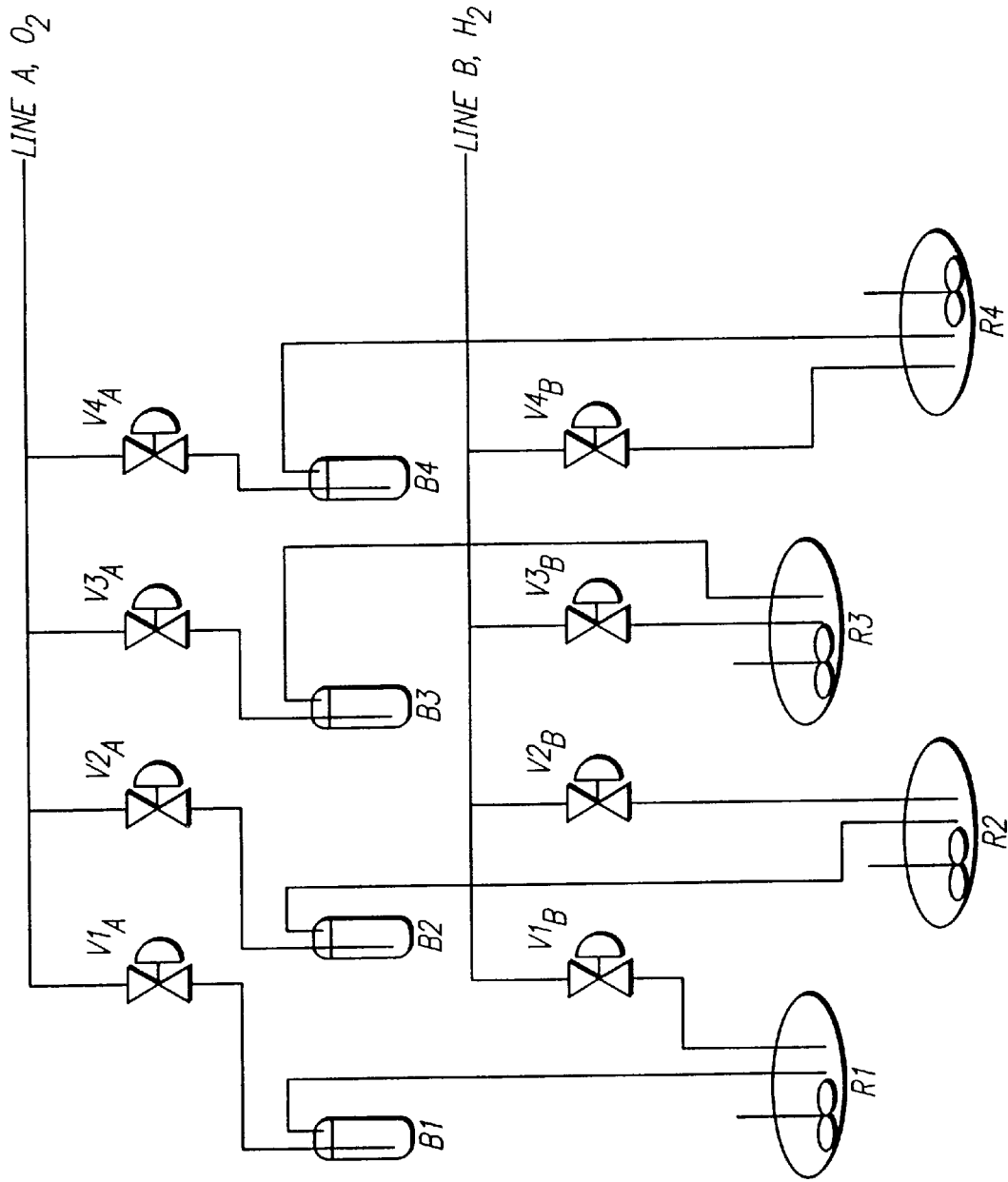

In the broadest sense, the present invention relates to corrosion and/or crack growth inhibitive compositions which are essentially non-toxic to the environment as well as unreactive to resilient, curable elastomeric materials so as not to affect the cure rate of the elastomeric material. The corrosion and/or crack growth inhibitive compositions of the present invention are (1) a mixture of (a) cerous molybdate and (b) at least one ammonium salt of phosphoric acid (ortho-, meta- or hypophosphoric acid) or ortho- or hypophosphorous acid, (2) cerous molybdate, or (3) one or more of the ammonium salts of phosphoric or phosphorous acid.

The cerous molybdate may be made by reacting cerous nitrate and sodium molybdate in an approximate stoichiometric ratio or approximately 1 to 1 by weight so as to provide a slight excess of cerous nitrate. The reaction is as follows: $3Na_2MoO_4 \cdot 2H_2O + 2Ce(NO_3)_3 \cdot 6H_2O \rightarrow Ce_2(MoO_4)_3 + 6NaNO_3 + 18H_2O$.

The reaction is carried out by dissolving the cerous nitrate and sodium molybdate in a suitable aqueous solvent, such as, for example, distilled water. Preferably, just enough solvent is used to dissolve the cerous nitrate and sodium molybdate. The compounds are then combined in an approximate stoichiometric ratio to produce a yellow precipitate which is cerous molybdate. The cerous molybdate can be separated from the sodium nitrate by any suitable means, such as by filtration. However, it is not necessary to separate the two reaction products and they may be used together with no deleterious effect. In addition, cerous molybdate per se or the mixture of cerous molybdate and sodium nitrate may be mixed with the ammonium salts of phosphorous acid or phosphoric acid of this invention. However, it should be noted that when parts by weight are used it is calculated for cerous molybdate per se and not the mixture of cerous molybdate and sodium nitrate.

The cerous molybdate or the cerous molybdate-ammonium salt mixture is preferably added to a liquid polymer composition which is then cured to a solid sealant or coating composition and more preferably said cerous molybdate and/or cerous molybdate-ammonium salt mixture is added to a liquid polymer which is curable to a solid elastomer.

As has also been noted before, in the more preferred feature of the present invention, zinc chloride is used in conjunction with the compositions of the present invention.

When cerous molybdate is used per se and added to a liquid polymer composition a sufficient amount of the cerous molybdate is added to provide corrosion and/or crack growth inhibition to metals such as aluminum. The amount necessary to achieve the desired result may vary depending upon the particular polymer but this is easily determined by one skilled in the art following the teachings of the present invention. Generally speaking, the amount of cerous molybdate blended with a liquid polymer composition will be from about 0.01 weight percent (e.g. 0.02 or 0.03 weight percent) to as high as 10 weight percent, the preferable amount being from about 1 weight percent to about 5 weight percent.

When the cerous molybdate is mixed with the ammonium salts of the present invention, the amount of the resulting mixture added to the polymeric composition is about the same as the amount of cerous molybdate per se added to said liquid polymer composition, i.e. from about 0.01 weight percent to about 14 weight percent (e.g. between about 0.01 weight percent to about 10 weight percent) and, preferably, from about 1 weight percent to about 5 weight percent.

The weight ratio of cerous molybdate to ammonium salt will vary but generally speaking the weight ratio will be between about 0.5:2 and 2:0.5.

The addition of the ammonium salts of phosphoric or phosphorous acid of the present invention to a liquid polymer curable to a sealant or coating and more preferably to a liquid polymer curable to an elastomeric solid is believed to inhibit corrosion resistance and/or crack growth of metal parts coated or sealed with such liquid polymer compositions. More specifically, the addition of one or more of the ammonium salts of phosphoric acid or phosphorous acid to the liquid polymer eliminates the pitting and erratic dissolution of aluminum or aluminum alloy parts coupled with cadmium plated steel, stainless steel or titanium fasteners, when such parts and fasteners are coated and/or sealed with the liquid polymer compositions of the present invention and such compositions are cured to a solid, preferably to a solid elastomer.

The amount of ammonium salts of phosphoric or phosphorous acid added to the liquid polymers of the present invention may vary. For example, in general, the amount of ammonium salts of phosphoric or phosphorous acid added to the liquid polymer is between about one weight percent and about 20 weight percent (based on the weight of the liquid polymer), with the preferred amounts being between about 3 weight percent and about 14 weight percent.

When zinc chloride is incorporated into the compositions of the present invention, the amount of zinc chloride added to either the cerous molybdate or the mixture of cerous molybdate and ammonium salts will be based on the weight of the cerous molybdate and may vary widely, e.g. the weight ratio of cerous molybdate to zinc chloride may be from about 0.5:2 to 2:0.5.

When zinc chloride is added to the ammonium salt compositions of the present invention, the amount may also vary widely, although generally speaking the weight ratio of cerous molybdate to the ammonium salt of phosphoric acid or phosphorous acid will be from about 0.5:2 to 2:0.5.

As noted hereinbefore, the particularly preferred polymers are polysulfides, polyethers, polythioethers and polyurethanes, particularly those which are mercaptan terminated and cured with an alkaline oxidation catalyst as manganese dioxide, calcium peroxide, etc.

By "polysulfides" we mean polymers having disulfide linkages, a number of which are commercially available under the name Thiokol polysulfides, such as those disclosed in U.S. Pat. No. 2,466,963. Other polysulfide polymers useful in the present invention are disclosed in U.S. Pat. Nos. 4,623,711 and 4,609,762. Both of these patents also disclose mercaptan terminated polysulfides. Polyurethane polymers useful in the present invention are well known in the art and are specifically disclosed in U.S. Pat. No. 3,923,748 which also discloses mercaptan terminated polyurethanes.

Similarly, polythioether polymers are also known in the art and are, for example, disclosed in U.S. Pat. No. 4,366,307. Mercaptan terminated polythioethers are also disclosed in this patent.

Polyethers useful in the present invention are known and are, for example, disclosed in U.S. Pat. No. 4,366,307 which also discloses mercaptan terminated polyethers.

Referring to FIG. 1, a potentiodynamic plot for 7075-T6 aluminum in a solution of 3.5% NaCl is shown. The ordinate axis referencing the impressed voltage in volts while the abscissa axis references the corrosion current in na/cm$^2$. Leg A of the plot representing the anodic lobe and leg B of the plot representing the cathodic lobe. Point C represents the rest potential and is important when aluminum is coupled to another metal having a different galvanic potential. The samples shown in FIG. 1 experienced a corrosion rate of 3.35 mils/yr.

FIG. 2 represents a potentiodynamic plot for 7075-T6 aluminum immersed in a 3.5% NaCl solution containing 0.05% MgCrO$_4$. Note the reduction in the corrosion current experienced by the cathodic lobe B of the plot, while the anodic lobe A remains essentially the same with reference to the impressed voltage.

Figure 3A:
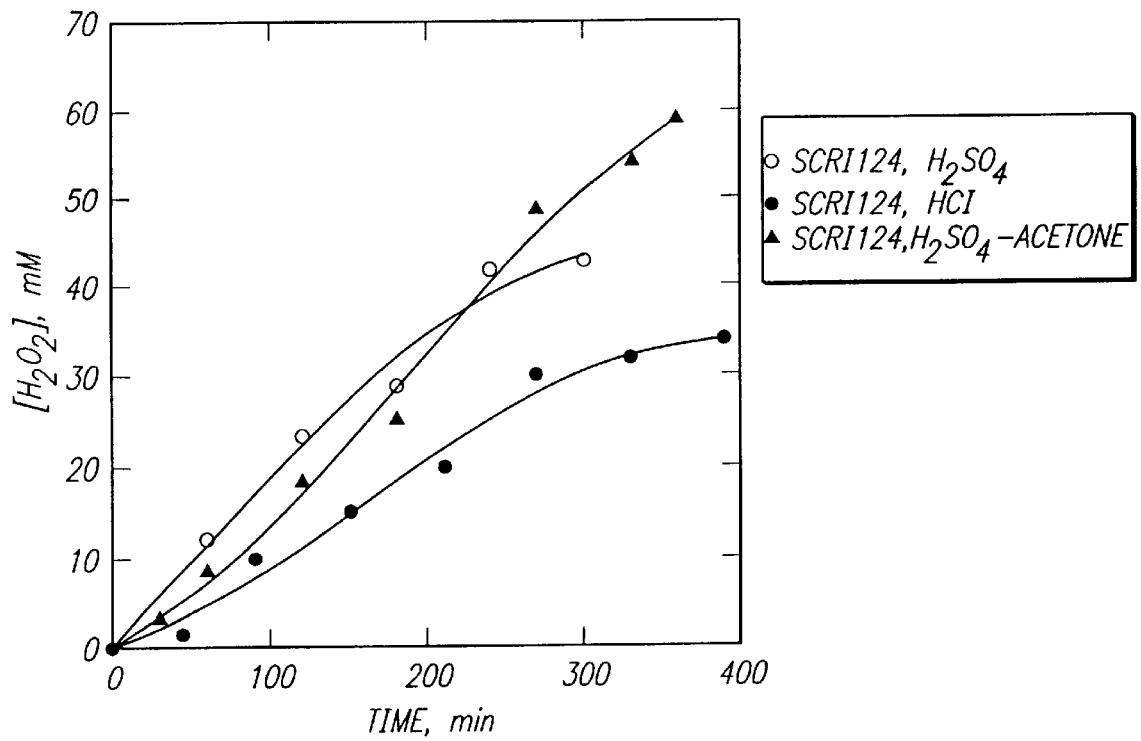
Figure 3B:
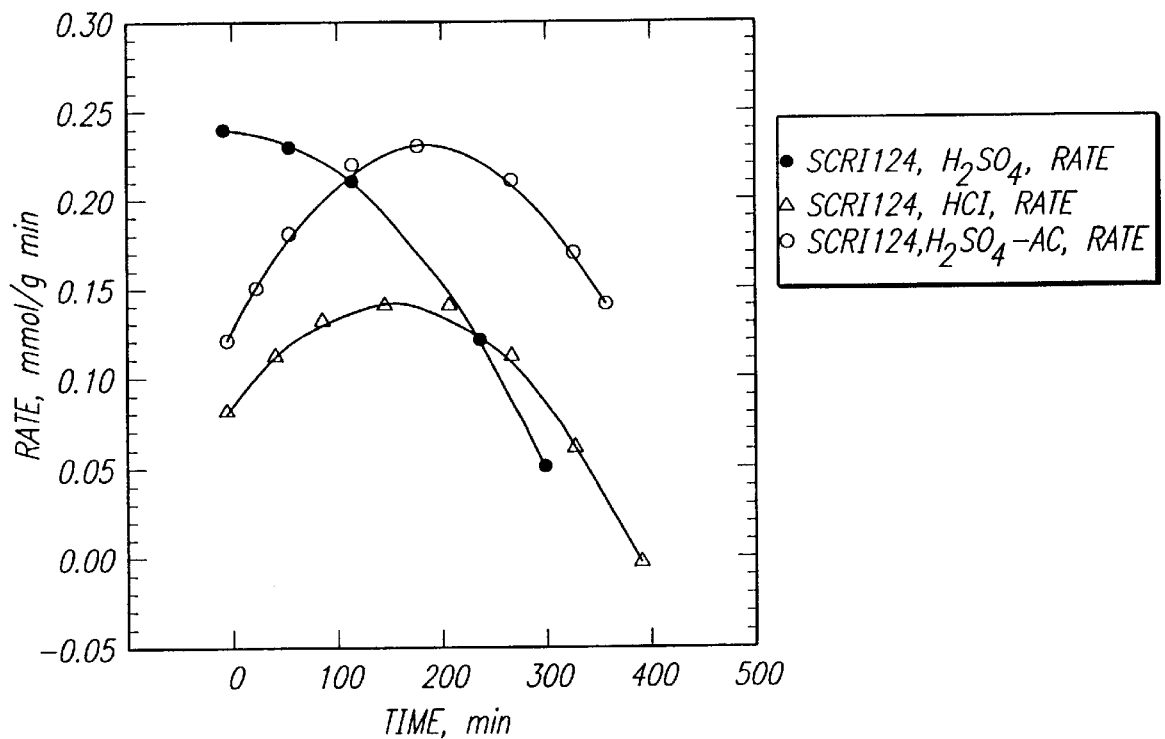
Figure 4A:
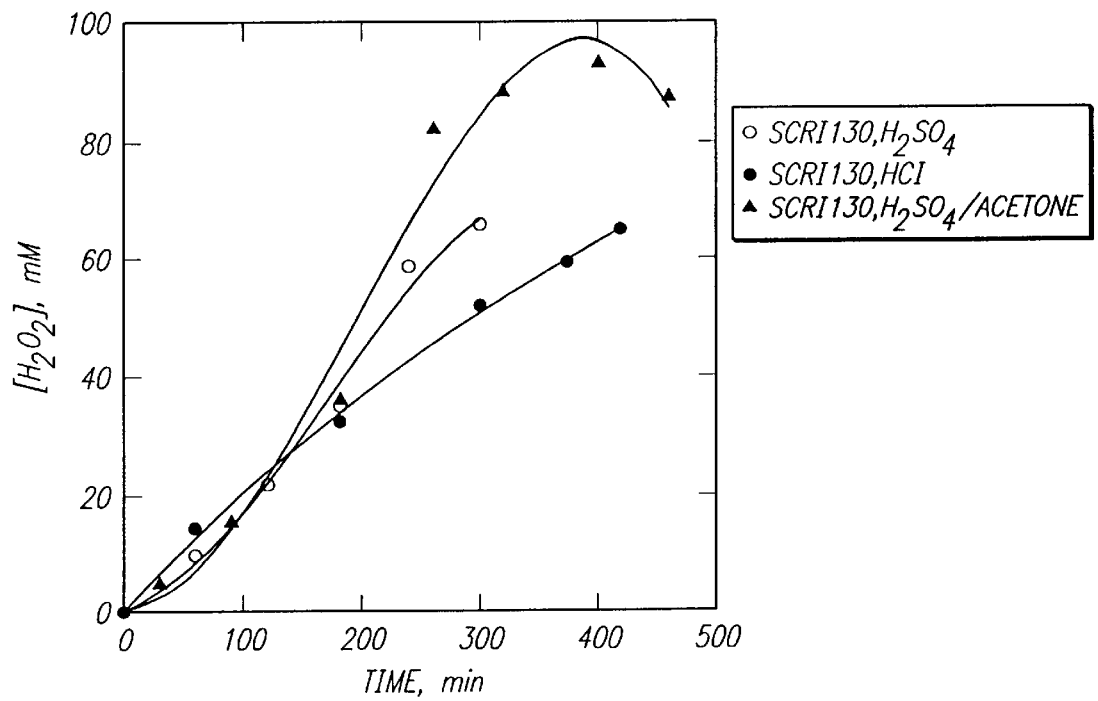
Figure 4B:
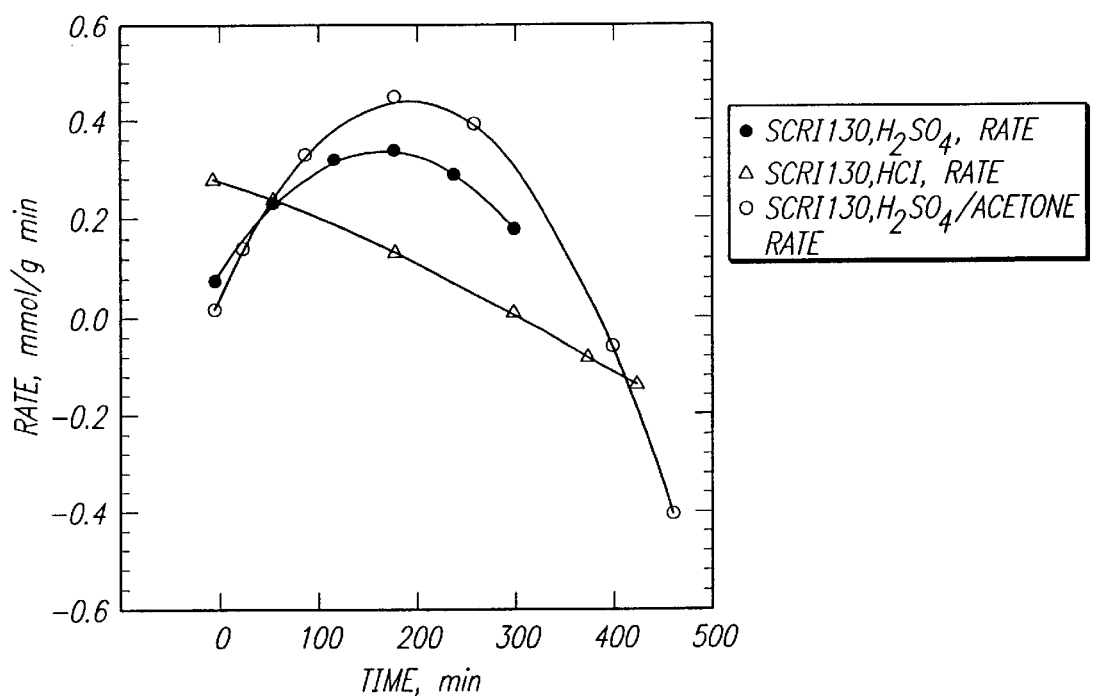
Figure 5A:
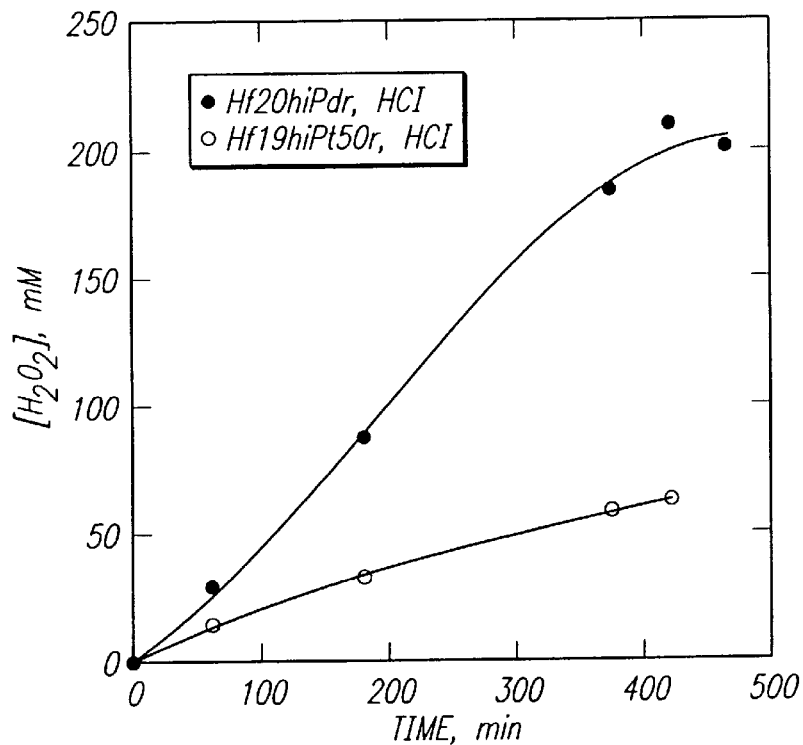
Figure 5B:
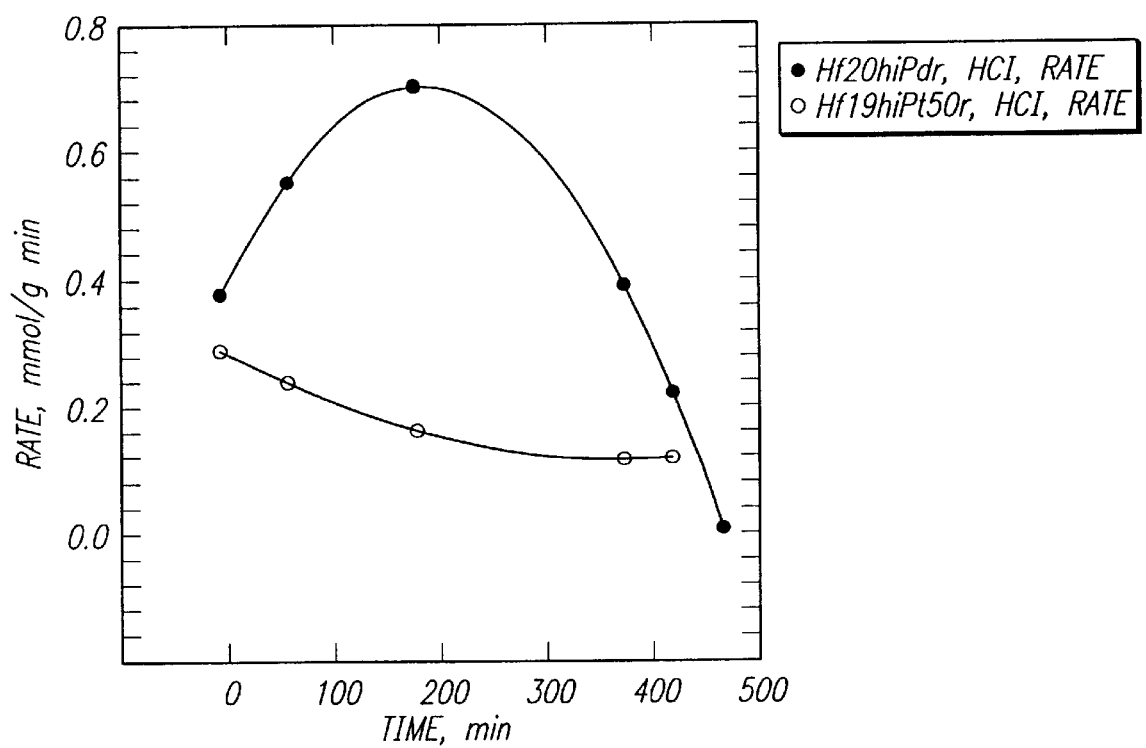
Figure 6A:
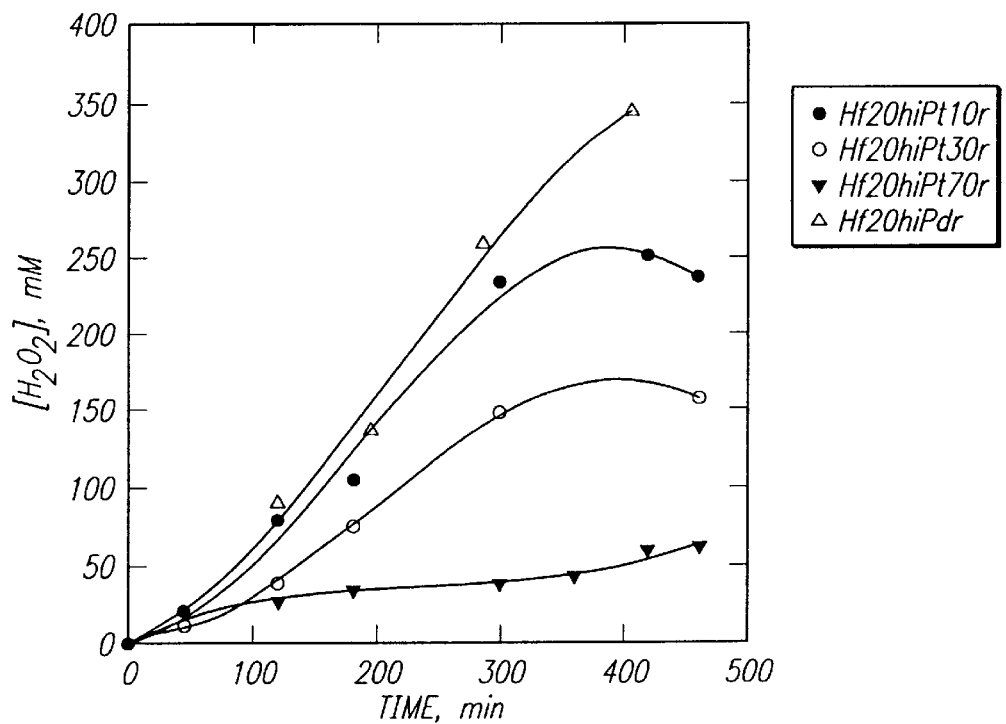
Figure 6B:
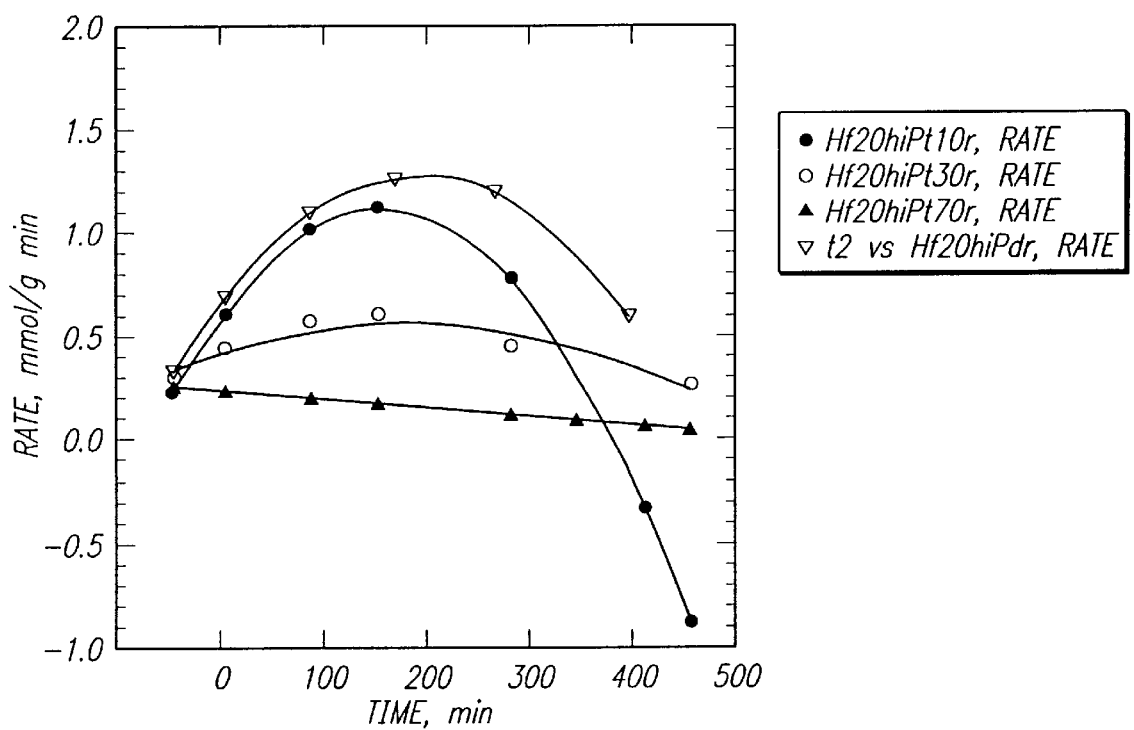
Figure 7A:
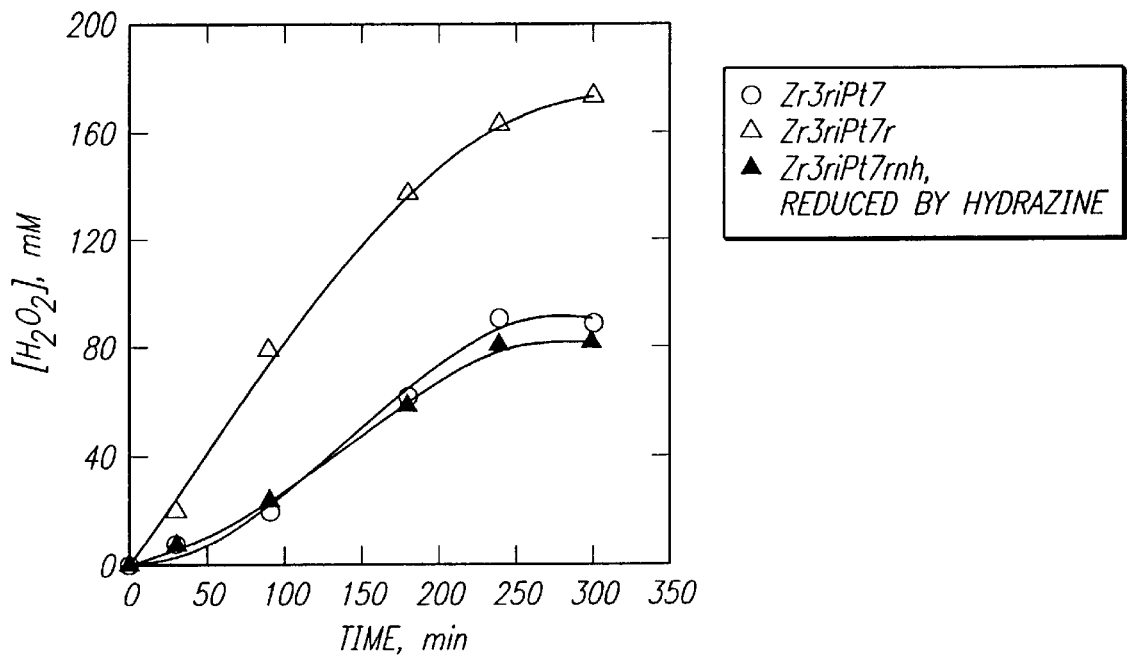
Figure 7B:
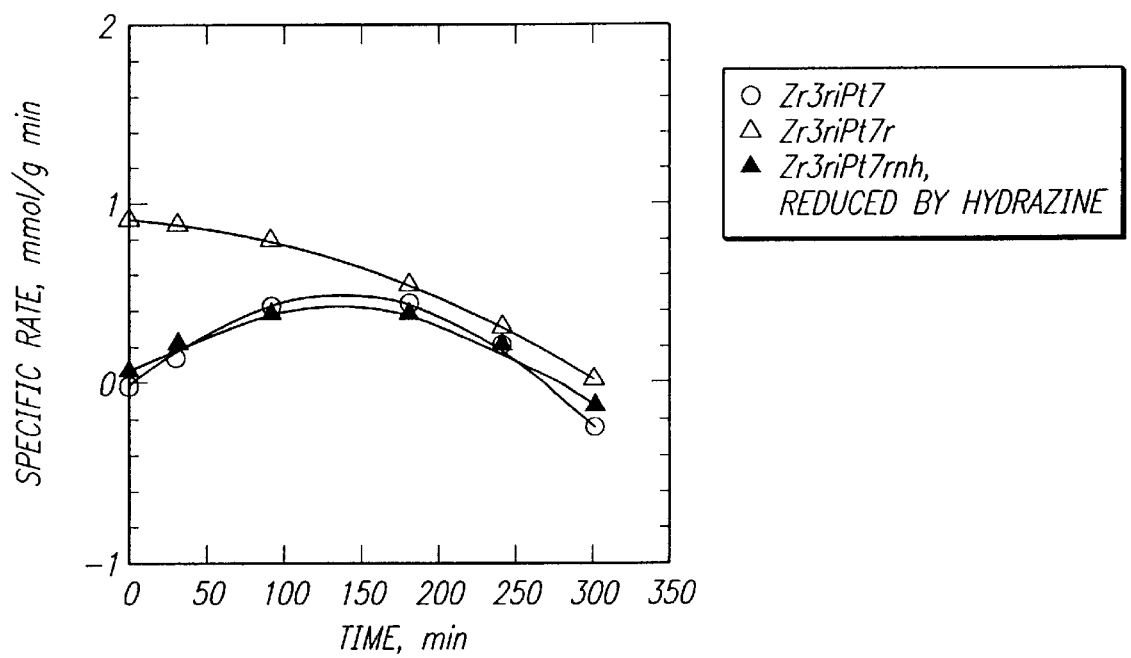
Figure 8A:
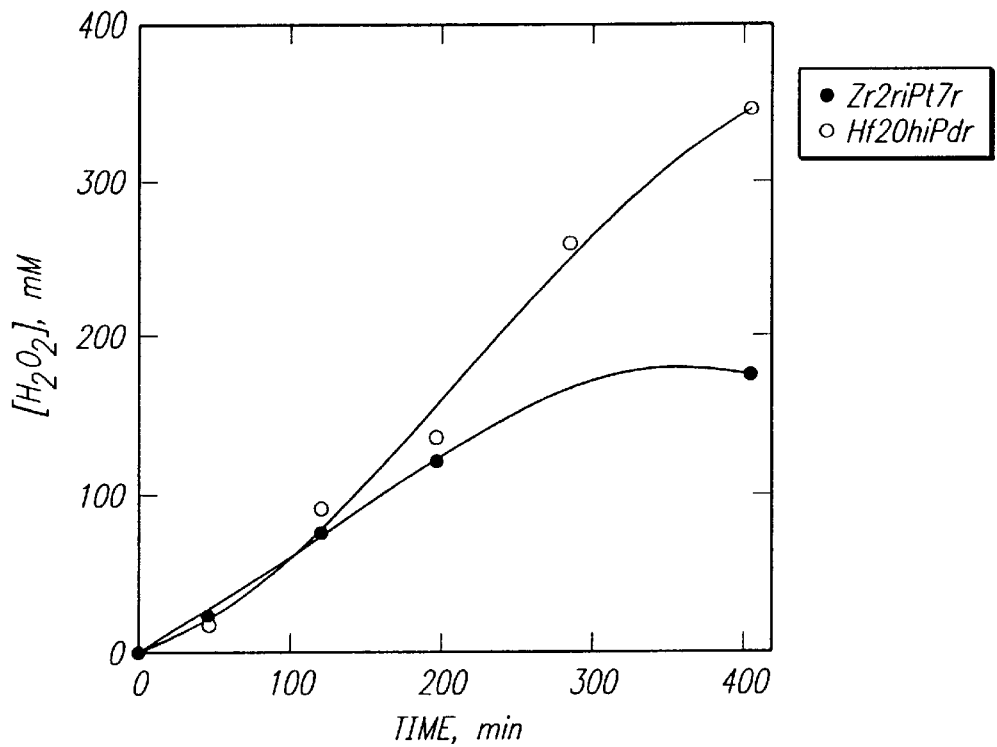
Figure 8B:
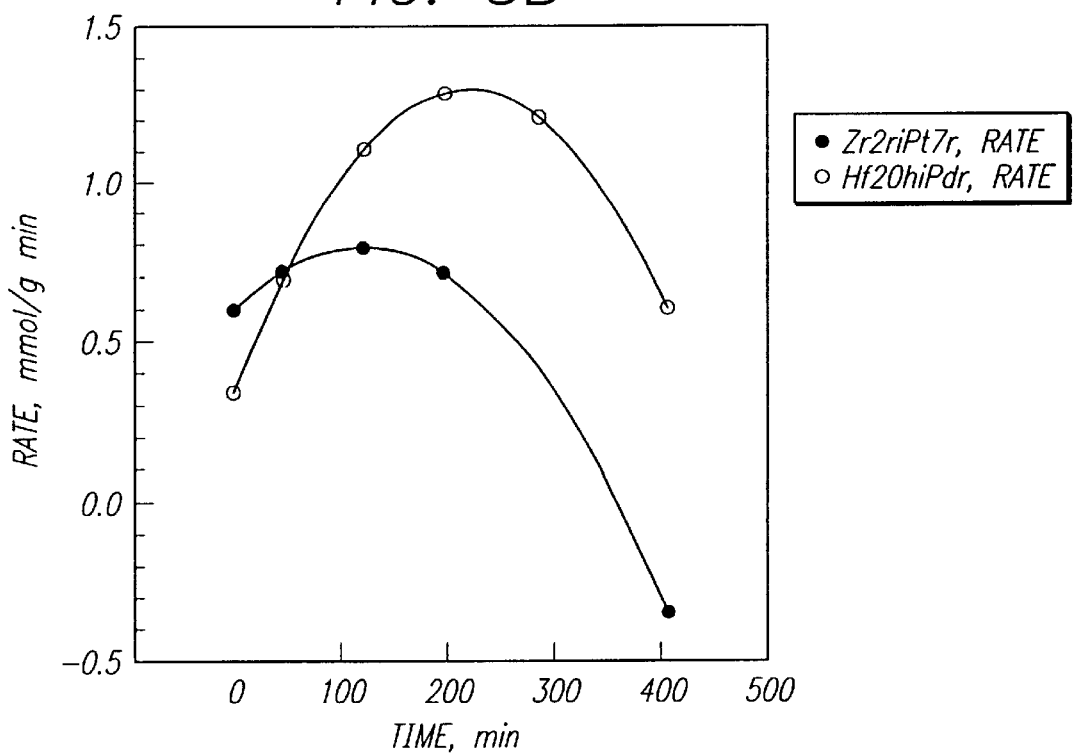
Figure 9A:
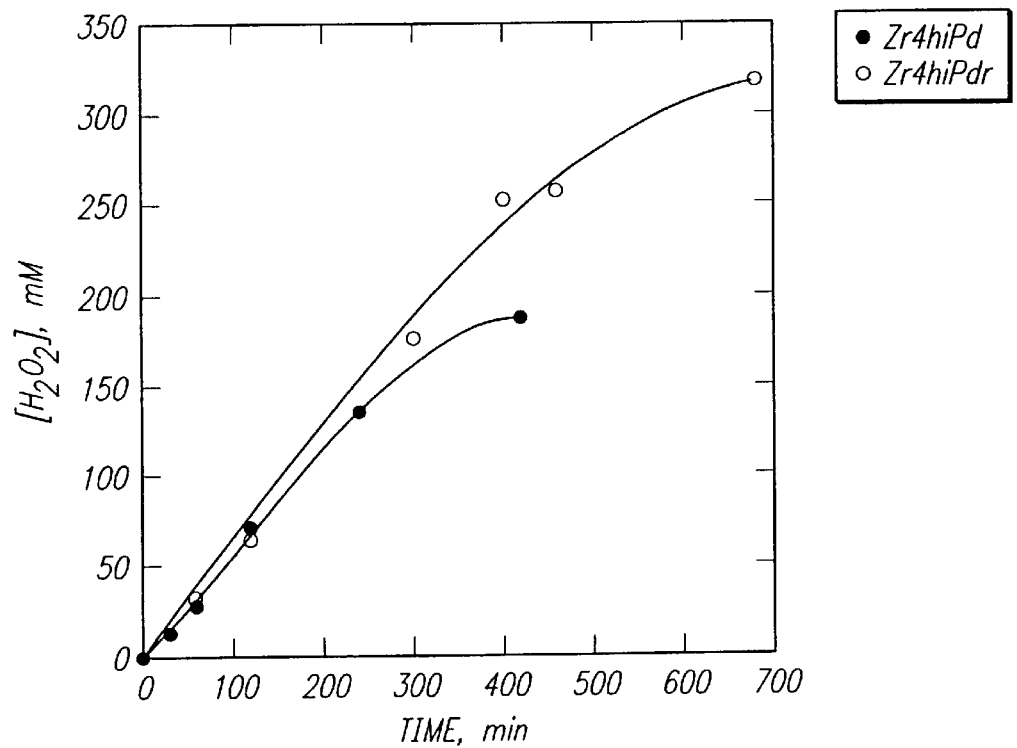
Figure 9B:
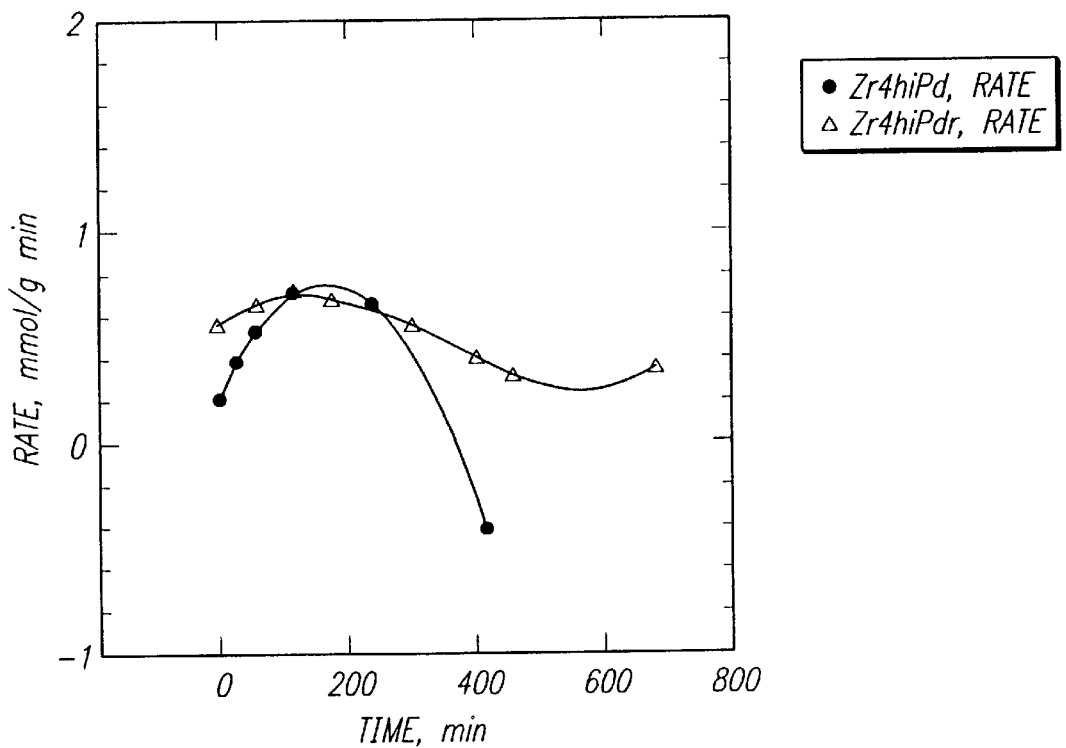
Figure 10A:
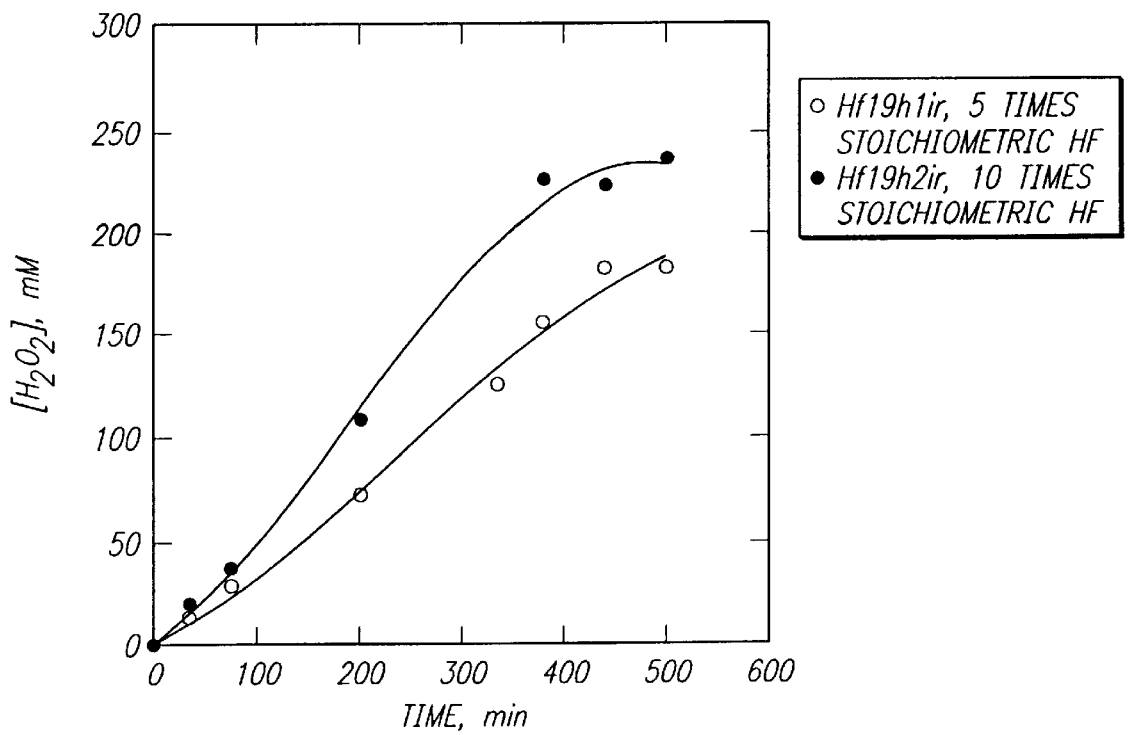
Figure 10B:
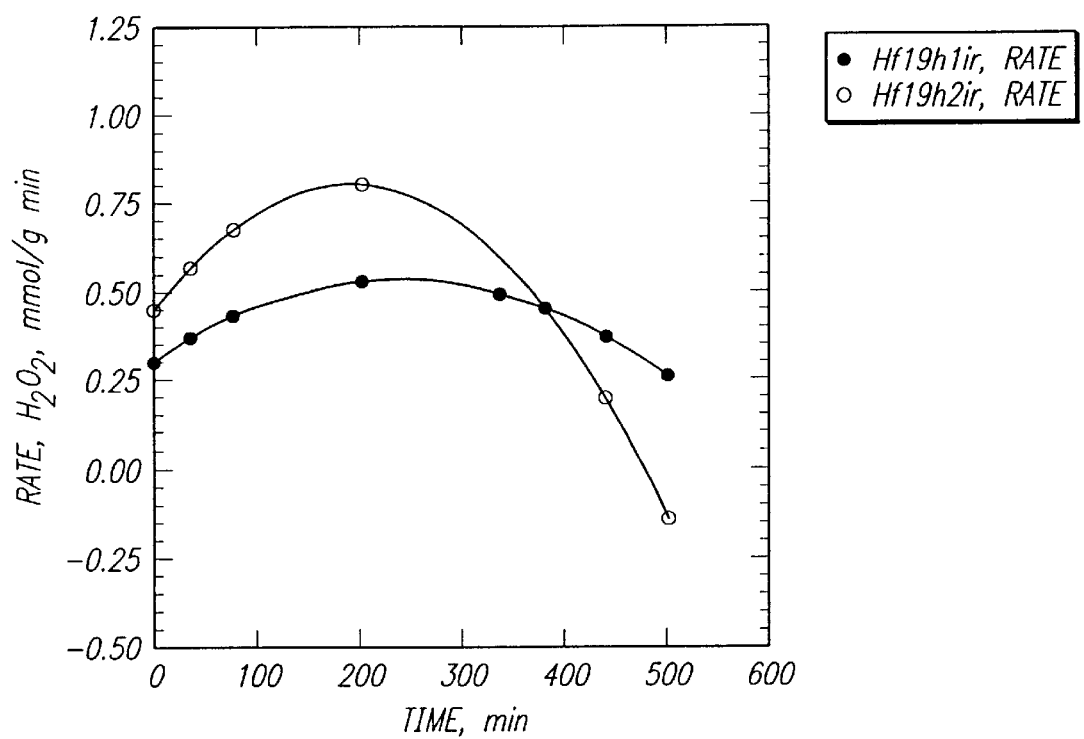
Figure 11A:
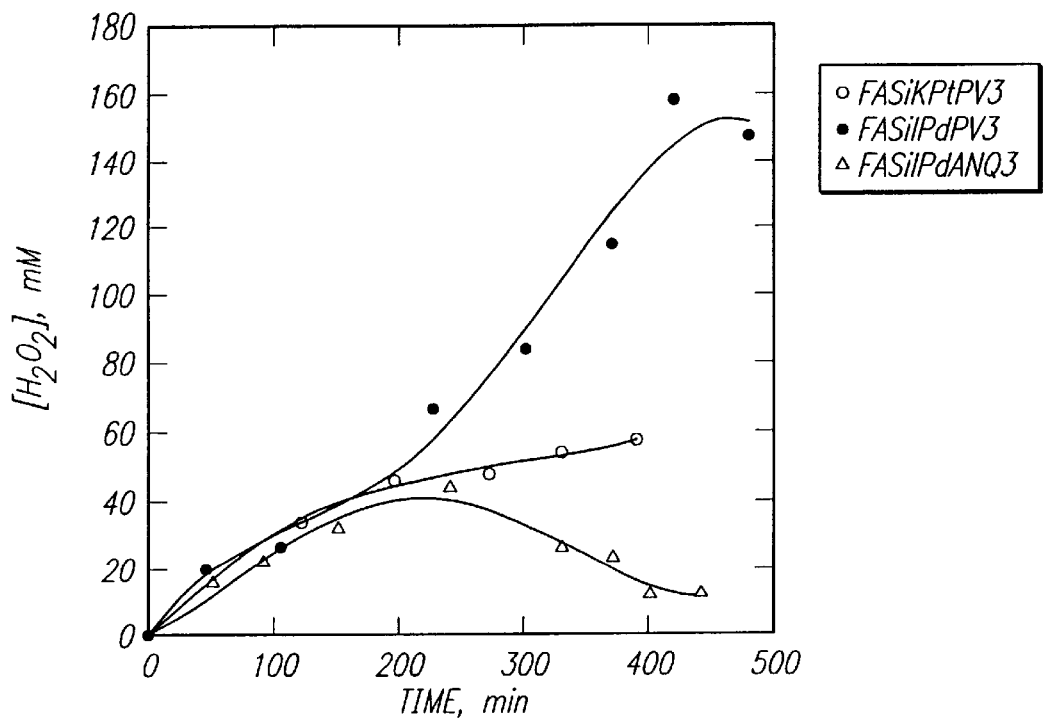
Figure 11B:
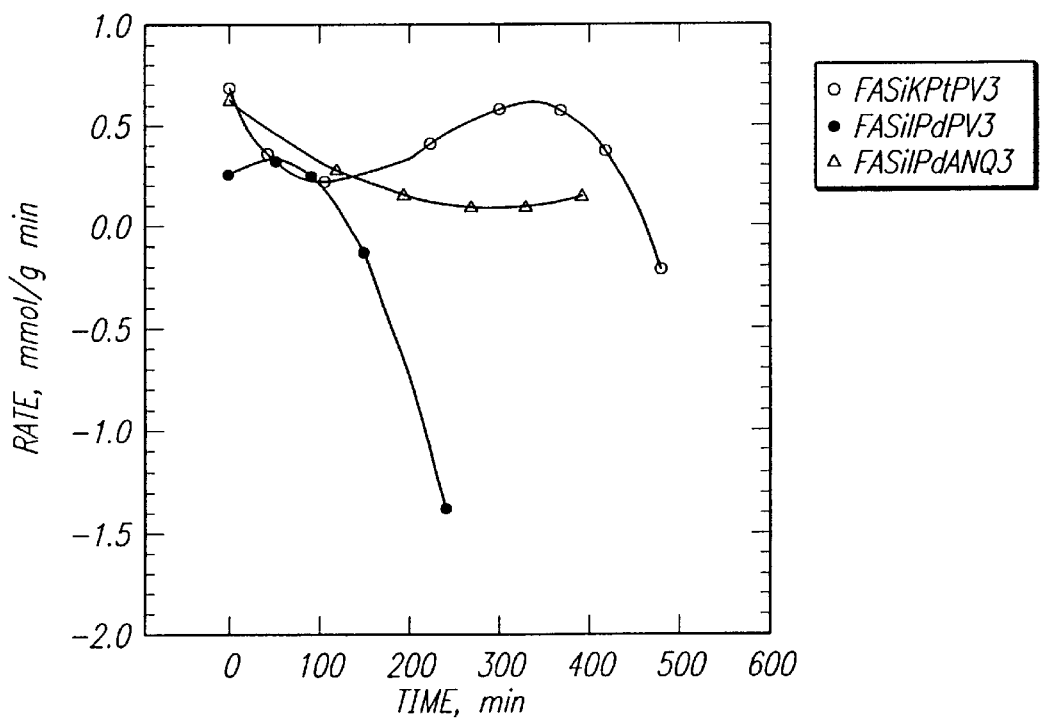
Figure 12:
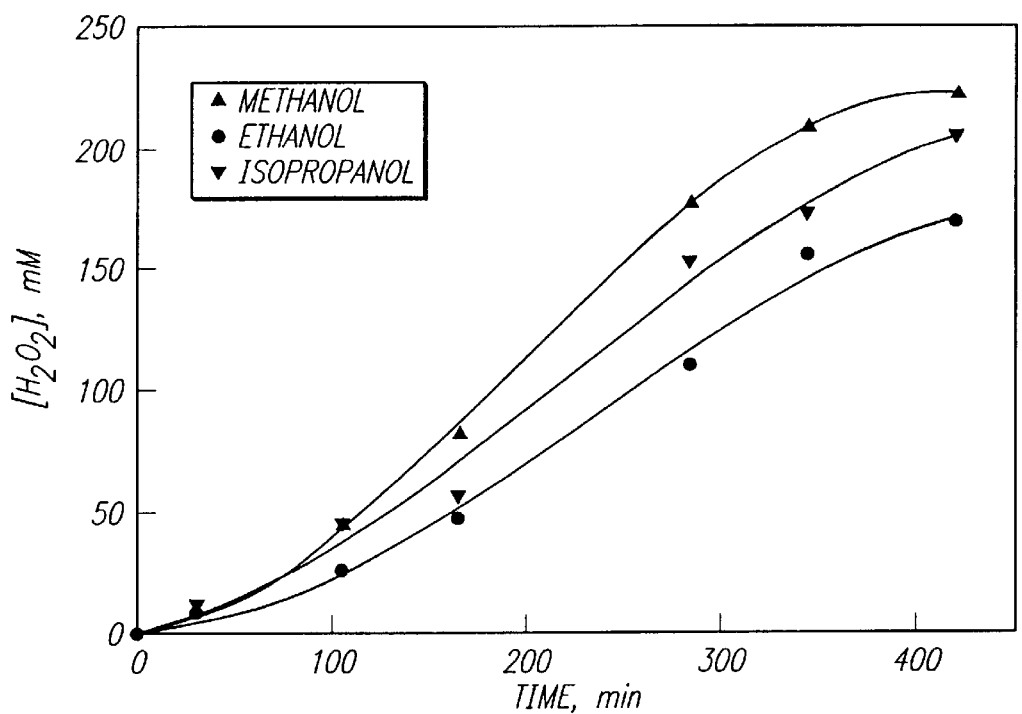
Figure 13:
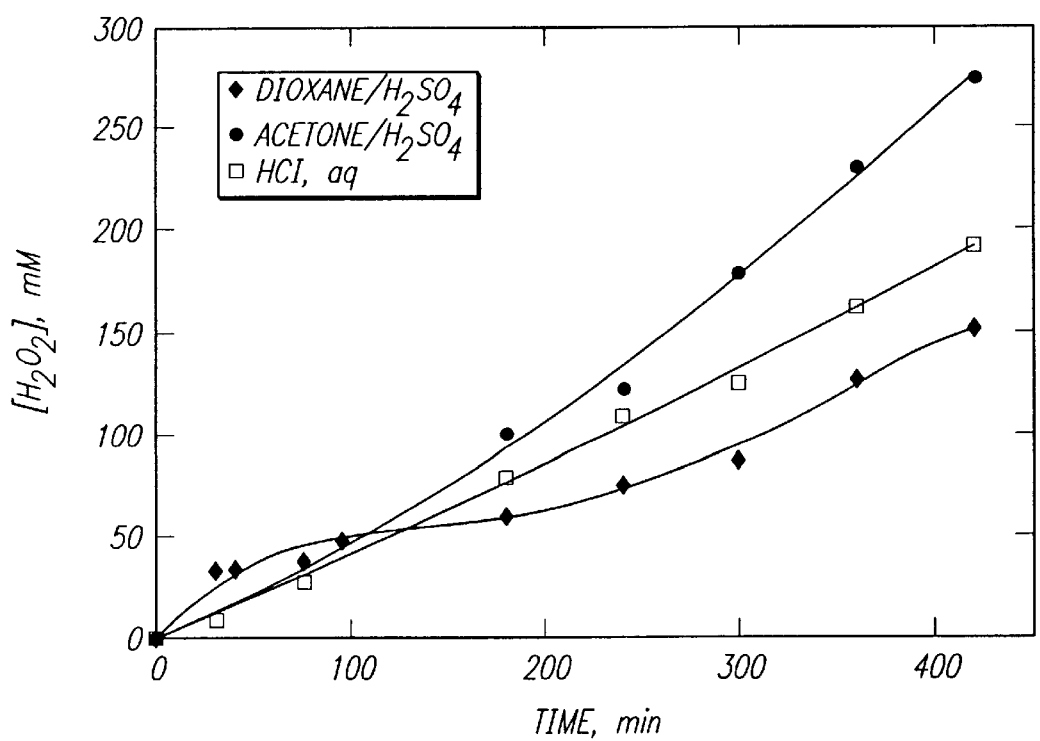
Figure 14:
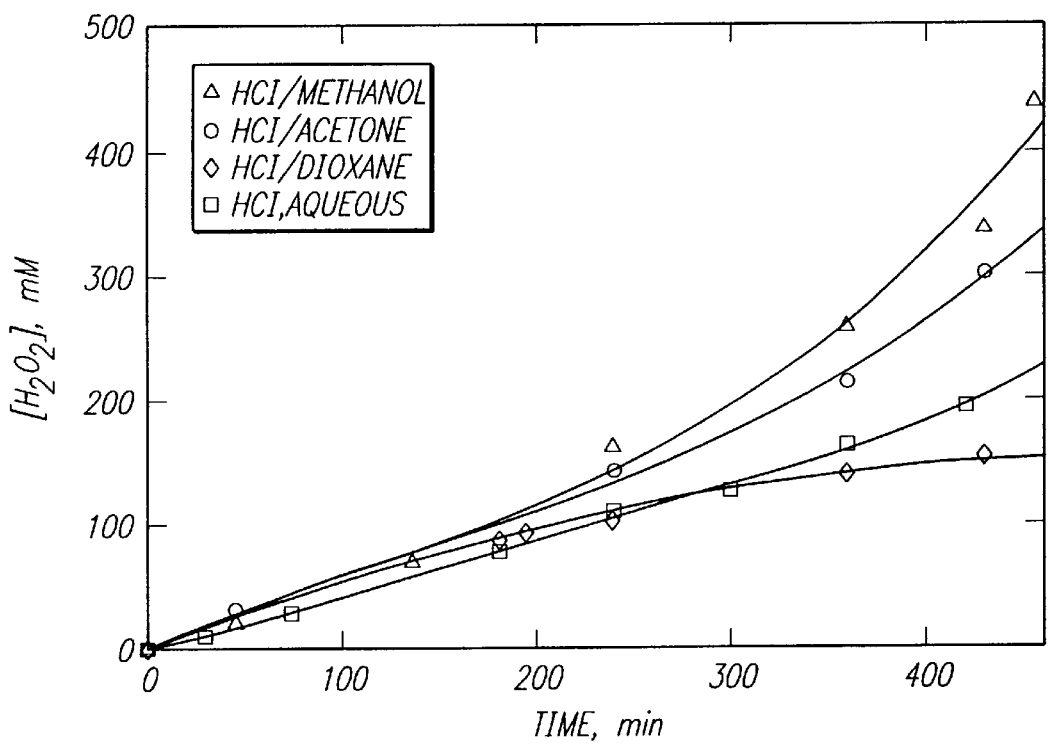
Figure 15:
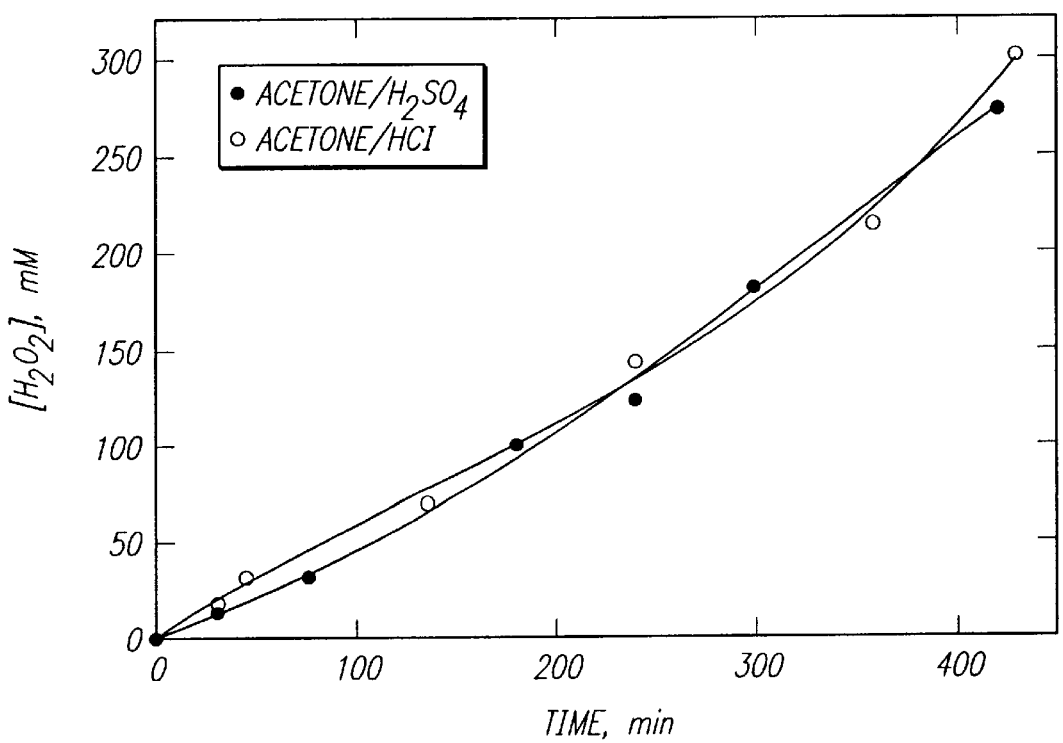
Figure 16:
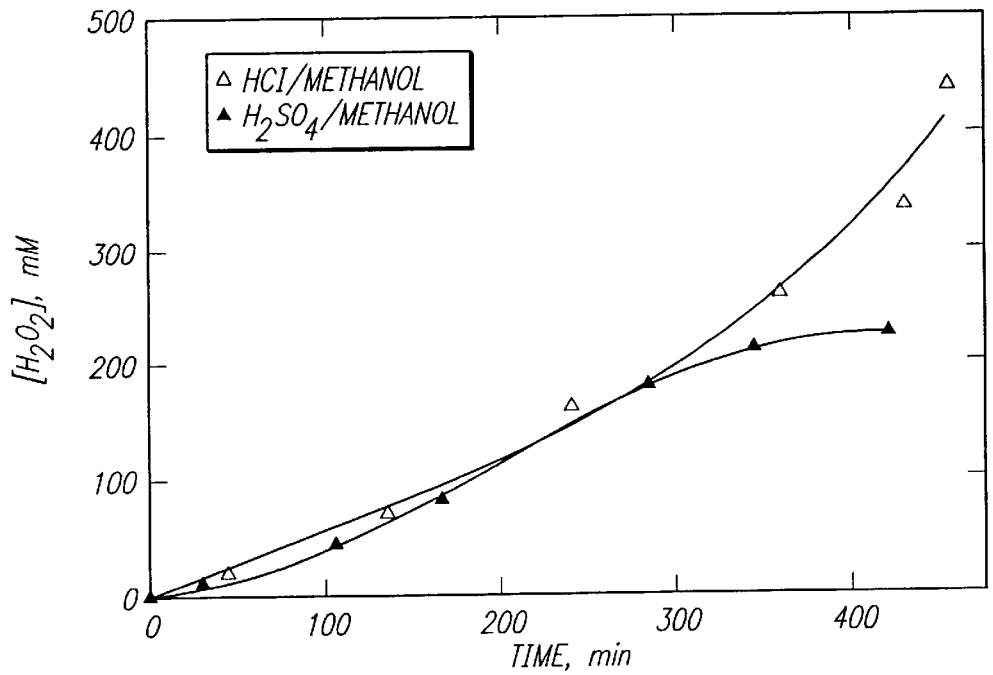
Figure 17:
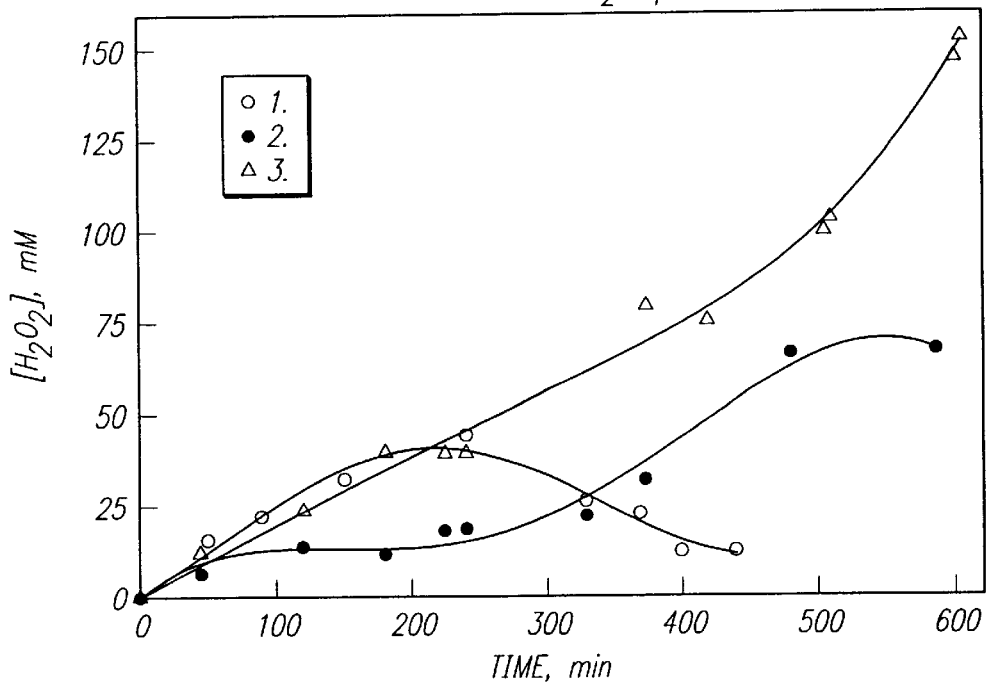

FIG. 3 is a potentiodynamic plot for 7075-T6 aluminum immersed in a solution of 3.5% NaCl and a sufficient amount of the unseparated reaction product of sodium molybdate and cerous nitrate to provide 0.018% of the cerous molybdate and 0.015% of sodium nitrate. Note the reduction in the corrosion current experienced by the cathodic lobe of the plot. The corrosion rate for this sample was found to be 0.21 mils/yr which compares favorably with the corrosion rate of 0.32 mils/yr experienced by the aluminum treated with a chromate containing inhibitor as shown by FIG. 2.

The cerous molybdate-sodium nitrate mixture used in FIG. 3, in an amount of 1 weight percent, was added to a polysulfide sealant (Mil-S-8802 A2) at the same time the manganese dioxide catalyst was added. The cure rate, as determined by viscosity measurements during the cure period, was virtually identical to that of a control batch of sealant which contained no inhibitor.

In another test, the following Table I represents the fatigue crack growth retardant quality of the inhibitors of the present invention. Center-crack fatigue specimens of 7075-T6 aluminum, four inches wide, 0.1 inches thick and 16 inches long, were used. A special technique was developed for exposing the cracks to liquids which have the same composition as moisture which as diffused through a film of polysulfide sealant. The polysulfide sealants were mixed with a manganese dioxide catalyst and applied to the lower half of 4-inch petri dishes to create polysulfide sealant films of approximately 1/16 inches thick. After the polysulfide sealant had cured, 10 ml. of distilled water was placed in each dish. At the end of 72 hours, the liquid, which had leeched inhibitor from the sealant, was decanted for use in the fatigue test.

The test specimens were subject to a tension-tension cycling at 5 Hz and the stress concentration at the crack tip (Delta K) was gradually increased from 5.0 to 11.0 KSI/sq.rt.in. The sealant extract was injected into the crack immediately prior to each 10,000 cycle test interval. The crack lengths were optically monitored through a 10 power microscope. The test results are summarized in Table I.

TABLE I

Results of Crack Growth Tests in 7075-T6 Aluminum Cycled at 5 HZ

| CRACK ENVIRONMENT | CRACK GROWTH PER CYCLE (da/dN) x E-6 INCHES Delta K (KSI/sq.rt.in.) | | | | |
|---|---|---|---|---|---|
| | 6 | 7 | 8 | 10 | 11 |
| Distilled Water | 4.6 | 8.1 | 12.4 | 23.5 | 30.9 |
| Distilled Water + Inhibitor I | 3.2 | 4.9 | 6.9 | 11.9 | 14.2 |
| Distilled Water + 200 ppm NaCl | 7.6 | 14.6 | 21.7 | 40.0 | 52.1 |
| Distilled Water + 200 ppm NaCl + Inhibitor I | 4.1 | 5.9 | 7.0 | 11.4 | 16.2 |

Inhibitor I was mixed with the polysulfide sealant in an amount of 3 weight percent, Inhibitor 1 being a mixture of cerous molybdate and ammonium hypophosphite in a weight ratio of 0.5:1.

As can be seen from Table I, the crack growth rate is decreased almost 50% when Inhibitor I is present in the water and from about 60% to over 70% when in the salt solution.

In another test, 7075-T6 aluminum was immersed in 0.35% NaCl aqueous solutions to which was added various inhibitors of the present invention. The corrosion rate was measured and the results are summarized in Table 2 wherein compound "A" is cerous molybdate and compound "B" is ammonium hypophosphite.

TABLE II

| INHIBITOR | CORROSION RATE (MILS/YR) |
|---|---|
| 1. 0.5gA, 0.5g B/liter | 1.51 |
| 2. 0.5gA, 1.0g B/liter | 0.95 |
| 3. 0.5gA, 1.5g B/liter | 1.16 |
| 4. 0.5gA, 0.7g B/liter | 1.69 |
| 5. 0.5gA, 0.5g B, 0.5g ZnCl/liter | 0.29 |

We have also devised another test to measure corrosion resistance. This test simulates a joint between the surfaces of two dissimilar materials and allows the entrance of the environment, permanently, into the interface, under conditions not unlike those experienced by structures in marine environments where collection of salt and water in joints is essentially irreversible. The driving potential of the coupled metals is also an important factor in increasing the corrosive attack by chemically reducing oxygen and water to form sodium hydroxide in close proximity to the aluminum surface rather than being washed away in salt spray. The nature of the observed corrosion parallels closely that found in the field, such as in operational aircraft. The specific test used by us is as follows:

Two inch by five inch panels of untreated aluminum alloy, 7075-T6 are coated with five 0.02"×½"/2" strips of sealant, each strip separated from the adjacent strip by a ½" band of an uncoated section of the aluminum. A candidate test metal (i.e. cadmium plated steel) of similar dimensions to the aluminum panel is pressed against the sealant coated side of the aluminum and held together by adhesive or masking tape on the ends leaving the 5" sides exposed. (Panels are coated on the back side with an insulating film where electrical measurements are to be made.) This sandwich type assembly is one half immersed in a trough of 3% salt water, edgewise, along its 5" length.

The trough is open to the atmosphere but loosely covered to limit water evaporation. To encourage galvanic corrosion, the metal couples are connected with alligator clips to induce corrosive current flow between the dissimilar metals. Salt water and oxygen diffuse into the cavities introduced by the 20 mil thick sealant into the ½" spacings. The shorted circuits may be opened at intervals to measure voltage and current flows with sensitive voltammeters or a Wheatstone bridge and finally examined for corrosion and undercutting of sealant on the inside surfaces of the cell sandwich.

In order to test various salts as inhibitor the following elastomeric sealant was used wherein the Polysulfide Polymer is manufactured and sold as Thiokol LP-32 by Morton Thiokol Chemical Corporation, Chicago, Ill. LP-32 has the formula $HS(RSS)_nRSH$ wherein R is $—C_2H_4—O—CH_2—O—C_2H_4—$ and the value of n is such that the molecular weight is 4,000.

ELASTOMERIC SEALANT

| Compound | Parts By Weight |
| --- | --- |
| Polysulfide Polymer (LP-32) | 100 |
| Calcium Carbonate (filler) | 50 |
| Phenolic Adhesion Promoter (2,4- diallyl phenol) | 3 |
| Salt Inhibitor | Variable |

To the above sealant composition was added 7 parts by weight of Manganese Dioxide catalyst having about 1 weight percent of sodium hydroxide, the catalyst being dispersed in eight parts by weight of hydrogenated terphenyl (Monsanto HB-40).

TABLE COMPARING ANTI-CORROSIVE BEHAVIOR OF POTENTIAL INHIBITORS In a Polysulfide Base Using an Aluminum-Cadmium Couple

| Inhibitor | Time Immersed | Weight % Inhibitor | Results |
| --- | --- | --- | --- |
| None | 3 days | — | Severe pitting of aluminum |
| None | 21 days | — | Severe pitting. Heavy corrosion products between sealant strips and under sealant. Adhesion loss. Steel rusting under cadmium plate. |
| Calcium molybdate | 7 days | 5 | Severe pitting and corrosion of aluminum. Loss of adhesion. |
| Sodium molybdate | 7 days | 5 | Extremely severe corrosion of aluminum. |
| Magnesium chromate | 21 days | 5 | Aluminum alloy and cadmium shiny, unchanged. |
| Ammonium hypophosphite | 21 days | 3 | Cadmium and aluminum alloy shiny. |
| Ammonium dihydrogen phosphate | 21 days | 3 | Metals unchanged. |
| Sodium Hypo phosphite | 7 days | 5 | Severe pitting and corrosion of aluminum |
| Sodium phosphate | 3 days | 5 | Extremely severe attack of aluminum |
| Ammonium hypophosphite + ammonium dihydrogen phosphate | 42 days | 4 | Appearance unchanged |
| Ammonium hypophosphite | 42 days | 14 | Some darkening and evidence of corrosion |

In addition to the galvanic-crevice corrosion cells employing aluminum alloy-cadmium couple, several other metals were coupled with the same aluminum alloy coated with strips of inhibited and uninhibited Thiokol polysulfide sealant with the following results:

TABLE SHOWING EFFECT OF VARIOUS INHIBITORS IN A POLYSULFIDE BASE ON CORROSION OF ALUMINUM ALLOY 7075-T6 COUPLED WITH VARIOUS AIRCRAFT CONSTRUCTION MATERIALS

| Inhibitor | Days/ Time | % Conc. | Couple | Visual Results |
| --- | --- | --- | --- | --- |
| None | 7 | — | Al-Ti | Severe destruction of aluminum sealant. Blistered. |
| None | 7 | | Al-C | Very Severe destruction of aluminum. Adhesion loss. |
| None | 7 | | Al-stainless | Worse attack than with titanium - Sealant largely destroyed |
| $MgCrO_4$ | 21 | 5 | Al-Ti | Aluminum attack but less than without inhibitor |
| $MgCro_4$ | 21 | 5% | Al-stainless steel | Little or no improvement over no inhibitor |
| $MgCrO_4$ | 7 | 5 | Al-carbon | No benefit over no inhibitor. Very severe aluminum loss |
| $NH_4H_2PO_2$ | 21 | 3 | Al-Ti | No change. Metals still shiny Sealant retains adhesion |
| $NH_4H_2PO_2$ | 21 | 3 | Al-stainless steel | Slight darkening of aluminum Adhesion OK |
| $NH_4H_2PO_2$ | 7 | 7 | Al-carbon | Mild corrosion of metal |
| $NH_4H_2PO_4$ | 21 | 3 | Al-Ti | Very slight discoloration visible. |
| $NH_4H_2PO_4$ $NH_4H_2PO_2$ | +21 | 1 1 | Al-stainless steel | No change. Metals shiny. |

While the aluminum usually shows no visual localized attack, in order to have a more quantitative evaluation of overall metal corrosion, the corrosion cells were opened at intervals and the current flow measured with a high impedance meter with the following results:

TABLE III

GIVING OBSERVED CURRENT FLOWS OF ALUMINUM-CADMIUM AND ALUMINUM-TITANIUM CELLS WITH TIME CURRENT IN MICRO AMPS

| Time | No Inhibitor | Magnesium Chromate | Ammonium dihydrogen phosphate + Ammonium Hypophosphite |
|---|---|---|---|
| couple Al-Cd | | | |
| Initial 1 day | 11 | 13.0 | 3.2 |
| Average 21 days | 14 | 7.94 | 3.82 |
| Final (21 days) | 25 | 6.1 | 3.2 |
| Al-Ti | | | |
| 1 day | 55 | 45.0 | 26.0 |
| Average 21 days | 65 | 33.3 | 24.0 |
| Final (21 days) | 75 | 29.0 | 25.0 |

The amount of magnesium chromate was 5 wt. % and the amount of the mixture is 5 wt. %, said mixture containing equal amounts of ammonium dihydrogen phosphate and ammonium hypophosphite.

TABLE IV

GIVING OBSERVED CURRENT FLOWS OF ALUMINUM-CADMIUM AND ALUMINUM TITANIUM CELLS

| Time | Magnesium Chromate | Ammonium Dihydrogen Phosphate | Cerous Molybdate +/ Ammonium Dihydrogen Phosphate |
|---|---|---|---|
| Al-Cd | | | |
| 8 days | 9.0 | 8.8 | 14.0 |
| 25 days | 6.6 | 11.0 | 1.02 |
| Al-Ti | | | |
| 8 days | 30 | 83 | 65 |
| 25 days | 29 | 58 | 58 |

The amount of each inhibitor was 5 weight percent and the mixture contained 3 parts by weight of ammonium dihydrogen phosphate and 1 part by weight of cerous molybdate.

CORROSION PROTECTION OF VARIOUS SEALANTS CONTAINING AMMONIUM HYPOPHOSPHITE

The benefits in corrosion resistance of the present invention are found in other polymers (utilizing the basic Elastomeric Sealant formula) using ammonium hypophosphite as the inhibitor.

| Polymer | Curing Agent | Inhibitor Parts By Wt. | Time Results |
|---|---|---|---|
| Mercaptan terminated polyurethane* | Manganese dioxide | 5 | 28 days - No observable corrosion. Metal shiny. |
| Thiokol LP-32 | Magnesium dichromate | 5 | 28 days - No observable corrosion. Metal shiny. |
| Mercaptan terminated polythioether** | Manganese Dioxide | 5 | 28 days - No observable corrosion. Metal shiny. |

*The polymer of Example IV of U.S. Pat. 3,923,748.
** The polymer of Example 13 of U.S. Pat. 4,366,307.

What is claimed is:

1. A method of inhibiting corrosion and crack growth of metals exposed to a salt water environment which comprises applying to a metal surface a corrosion and crack growth inhibitive effective amount of a corrosion and crack growth inhibitive composition consisting essentially of:
    (a) at least one water soluble ammonium salt of phosphoric acid, orthophosphorous acid or hypophosphorous acid and;
    (b) cerous molybdate.

2. A method according to claim 1 wherein said metal is aluminum.

3. A method according to claim 1 wherein said composition is applied to the surfaces of at least two metals which are dissimilar and joined together.

4. A method according to claim 1 wherein said ammonium salt is selected from the group consisting of ammonium orthophosphate and ammonium phosphite.

5. A method according to claim 1 wherein said ammonium salt is dihydrogen phosphate.

6. A method according to claim 1 wherein said ammonium salt is ammonium hypophosphite.

7. A method according to claim 1 wherein the weight ratio of said cerous molybdate to said ammonium salt and said inhibitive composition is from about 0.5:2 to about 2:0.5.

8. A method according to claim 1 wherein said inhibitive composition also contains zinc chloride.

9. A method according to claim 8 wherein the weight ratio of cerous molybdate to ammonium salt to zinc chloride in said inhibitive composition is between about 0.5:2:2 and about 2:0.5:0.5.

10. A method according to claim 1 wherein said corrosion crack growth inhibitive composition is mixed with a liquid polymer curable to an elastomer prior to applying said composition to said metal surface.

11. A method according to claim 10 wherein said liquid polymer selected from the group consisting of polysulfide, polyurethane, polythioether and polyether.

12. A method according to claim 11 wherein said liquid polymer is curable to an elastomer and is mercaptan terminated.

13. A method according to claim 12 wherein said liquid polymer is mercaptan terminated.

14. A method according to claim 10 wherein said liquid polymer contains a curing effective amount of a curing catalyst.

15. A method according to claim 14 wherein said curing catalyst is an alkaline oxidation catalyst.

16. A method for inhibiting corrosion and crack growth of two dissimilar metal parts which have a joint therebetween formed by the opposed mating surfaces of said dissimilar metal parts, said method comprising:
    filling said joint with a liquid polymer composition consisting essentially of
    (a) a liquid polymer curable to a solid elastomeric sealant,
    (b) a corrosion and crack growth inhibitive composition consisting essentially of (i) at least one water soluble ammonium salt of phosphoric acid, orthophosphorous acid or hypophosphorous acid and
(ii) cerous molybdate; and
(c) a curing effective amount of a catalyst for curing said liquid polymer to a solid elastomeric sealant, and
curing said liquid polymer to a solid elastomeric sealant to form a seal in said joint between said opposed surfaces of said dissimilar metal parts.

17. A method according to claim 16 wherein one of said metal parts is aluminum.

18. A method according to claim 17 wherein said ammonium salt is selected from the group consisting of ammonium orthophosphate and ammonium phosphite.

19. A method according to claim 17 wherein said ammonium salt is selected from the group consisting of ammonium dihydrogen phosphate and ammonium hypophosphite.

20. A method according to claim 19 wherein said liquid polymer is mercaptan terminated.

21. A method according to claim 20 wherein said catalyst is an alkaline oxidation catalyst.

22. A method according to claim 21 wherein said alkaline oxidation catalyst is alkaline manganese dioxide.

23. A method according to claim 16 wherein the weight ratio of said water soluble ammonium salt and cerous molybdate in said corrosion and crack growth inhibitive composition is between about 0.5:2 and 2:0.5.

24. A method according to claim 16 wherein said corrosion and crack growth inhibitive composition also contains zinc chloride.

25. A method according to claim 24 wherein the weight ratio of said cerous molybdate to said ammonium salt to said zinc chloride is between about 0.5:2:2 and about 2:0.5:0.5.

26. A composition which, when applied to metals, inhibits the corrosion of such metals, said composition consisting essentially of
(a) at least one water soluble ammonium salt of phosphoric acid, orthophosphorous acid or hypophosphorous acid and
(b) cerous molybdate.

27. A composition according to claim 26 wherein the weight ratio of said cerous molybdate to said ammonium salt is from about 0.5:2 to 2:0.5.

28. A composition according to claim 26 wherein said composition also includes zinc chloride.

29. A composition according to claim 28 wherein the weight ratio of said cerous molybdate to said ammonium salt to said zinc chloride is from about 0.5:2:2 to about 2:0.5:0.5.

30. A composition according to claim 26 wherein said composition includes a major amount of a liquid polymer curable to a solid elastomer.

31. A composition according to claim 30 wherein said liquid polymer is mercaptan terminated.

32. A composition according to claim 31 wherein said liquid polymer is selected from the group consisting of polysulfide, polyurethane, polythioether, and polyether.

33. A composition according to claim 32 wherein said composition contains a curing effective amount of a curing catalyst.

34. A composition according to claim 23 wherein said catalyst is an alkaline oxidation catalyst.

35. A composition according to claim 34 wherein said alkaline oxidation catalyst is alkaline manganese dioxide.

* * * * *